United States Patent

[11] 3,604,443

[72] Inventor John Christopher Hammond Davis
Taplow, England
[21] Appl. No. 868,803
[22] Filed Oct. 23, 1969
[45] Patented Sept. 14, 1971
[73] Assignee Plessey BTR Limited
Taplow, England
[32] Priority Nov. 28, 1968
[33] Great Britain
[31] 56,620/68

[54] FLUIDIC OSCILLATORS
7 Claims, 7 Drawing Figs.

[52] U.S. Cl. .......... 137/81.5
[51] Int. Cl. .......... F15c 1/08
[50] Field of Search .......... 235/201
ME, 201 PF, 201 FS; 137/81.5

[56] References Cited

UNITED STATES PATENTS

| | | | |
|---|---|---|---|
| 3,180,575 | 4/1965 | Warren | 137/81.5 X |
| 3,185,166 | 5/1965 | Horton et al. | 137/81.5 |
| 3,223,101 | 12/1965 | Bowles | 137/81.5 |
| 3,248,043 | 4/1966 | Toplin et al. | 137/81.5 X |
| 3,331,381 | 7/1967 | Quigley, Jr. | 137/81.5 |
| 3,399,829 | 9/1968 | Richards et al. | 235/201 |
| 3,504,691 | 4/1970 | Campanuoto et al. | 137/81.5 |
| 3,511,256 | 5/1970 | Abler | 137/81.5 |

*Primary Examiner*—Samuel Scott
*Attorney*—Young & Thompson

ABSTRACT: In a pure fluid oscillator of the RC type having a long time constant, only the reference pressure is used and the arrangement is such that the pressure in the capacitor or capacitors of the oscillator decays to this pressure. The oscillator comprising a fluidic bistable device, one output of which is connected via a fluidic RC circuit to the input of a fluidic amplifier. The output of this amplifier is so connected to an input of the bistable device that the bistable device changes from a first state to a second state when the input to the amplifier reaches a predetermined pressure. The invention is applicable to monostable circuits as well as to free-running oscillators.

PATENTED SEP 14 1971 3,604,443

INVENTOR
JOHN CHRISTOPHER HAMMOND DAVIS
BY Young & Thompson
ATTYS.

FLUIDIC OSCILLATORS

This invention relates to pure fluid oscillators and more particularly to pure fluid oscillators of the RC type having a long time constant.

It is an object of the invention to provide a pure fluid oscillator of the RC type having a long time constant in which the oscillation period is not sensitive to small changes in the pressure at which switching takes place.

According to the invention, a pure fluid oscillator comprises a fluidic bistable device, one output of which is connected via a fluidic resistance to a fluidic capacitor and thence to the input of a fluidic amplifier, the output of which is so connected to an input of the bistable device that the bistable device changes from a first state to a second state when the input to the amplifier reaches a predetermined pressure.

Thus, only one reference pressure is used and the arrangement is such that the pressure in the capacitor or capacitors of the oscillator decays to this pressure. Switching always takes place relative to this reference pressure. The invention is applicable to monostable circuits as well as to free running oscillators.

The invention will be more readily understood from the following more detailed description with reference to the accompanying drawing in which.

Figure 1:
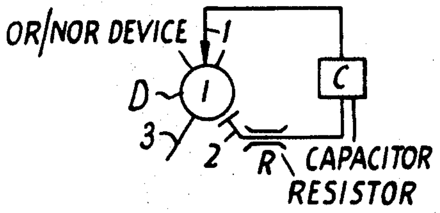
FIG. 1 is a schematic diagram of a conventional RC Oscillator.

FIG. 1 shows a conventional fluidic RC oscillator using an OR/NOR device D as the active element. It will be seen that the NOR output 2 of the device D is connected via a restrictor or resistance R and capacitor C to the input 1 of the device D. The OR output 3 of the device D can be used as the oscillator output.

Assume first that the OR/NOR device D is discharging through its NOR output 2 via resistance R and into capacitor C. When the pressure in capacitor C has risen to a value such that the pressure at the controlling input 1 of the OR/NOR device has risen to the upper switch point, the device switches so that it discharges through its OR output 3. The capacitor C then discharges through the OR/NOR device until the pressure at the controlling input 1 thereof reaches the lower switch point. The OR/NOR device then switches again to discharge through the NOR output 2 and the cycle repeats.

Ideally, the OR/NOR device would have infinite input impedance zero output impedance and an output pressure and hysteresis which are in constant ratio. The oscillation period will then depend only on the values of R and C. However, commonly used pure fluid devices have moderate input and output impedances so that the value of the resistance R cannot be high and consequently large time constants must be achieved with large values for the capacitance C which necessarily involve large and inconvenient volumes. This is because as R increases to near its upper limit, the pressure waveform becomes asymptotic to the upper and/or lower pressure switch point, as can be seen from FIG. 2, and any slight change in the switch points consequently causes large changes in the oscillation period and could even prevent oscillation entirely. The upper switch point is particularly susceptible to this and is consequently much affected by noise. The difficulty can be somewhat reduced in the case of the lower switch point by making it close to atmospheric pressure, but an OR/NOR device with a very low pressure switch point may not switch back reliably.

Figure 3:
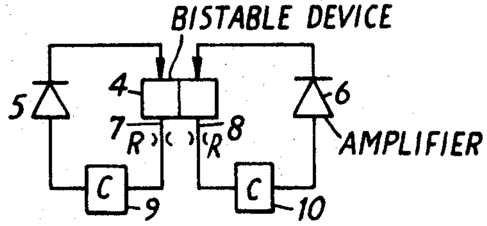
FIG. 3 is a schematic diagram of a free-running oscillator in accordance with the invention.

FIG. 3 shows a circuit in accordance with the invention. The active element is a bistable device 4, the outputs of which are connected, via respective resistances R and capacitors C (9 and 10), the inputs of amplifiers 5 and 6 which have substantially flat saturation characteristics. The amplifiers 5 and 6 have inverted outputs which drive the inputs of the bistable device 4. Assume that, initially, the output 7 of the bistable device is active. The corresponding capacitor 9 becomes charged and consequently the inverted output from the amplifier 5 disappears. Meanwhile, the output 8 from the bistable device 4 is inactive and consequently the capacitor 10 is discharging. When it reaches a sufficiently low pressure, the amplifier 6 produces an output of a magnitude sufficient to change over the bistable device 4. The capacitor 10 will then be charged and the capacitor 9 discharged until the amplifier 5 gives an output sufficient to change over the bistable device 4 and start the cycle again.

Figure 2:
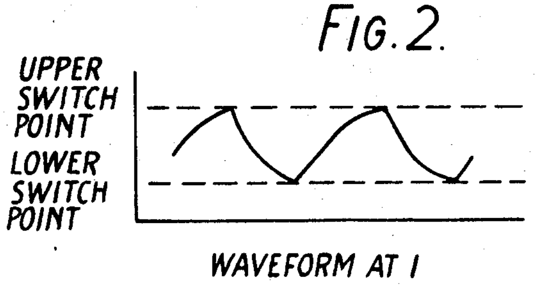
FIG. 2 is a waveform diagram illustrating the operation of the oscillator shown in FIG. 1.
Figure 4:
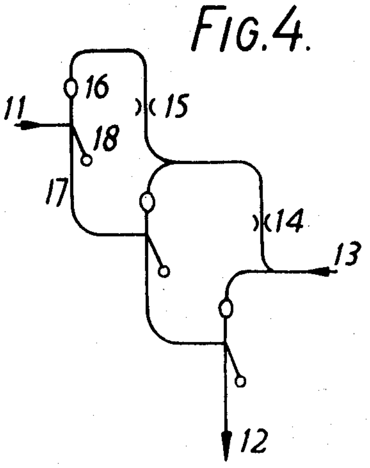
FIG. 4 is a schematic diagram of an amplifier for use with the embodiment shown in FIG. 3.

FIG. 4 shows a three stage momentum interaction amplifier suitable for use as one of the amplifiers 5 and 6 in FIG. 2. The amplifier shown in FIG. 4 has a signal input 11, an output 12 and a power input 13. The power supply input 13 is successively reduced in pressure by restrictors 14 and 15 so that the various stages of the amplifier work at successfully increasing power level. Since the output 17 is aligned with the supply jet 16, fluid from the supply jet 16 of the first stage flows to the output 17 thereof and thus to the second stage when there is no input signal at the input 11. If the pressure at the input 11 is increased, an increasing proportion of the output from the first stage is vented via the output 18 to atmosphere until there is no output signal in the output 17. Thus, the first stage acts as an inverting amplifier. Similarly, the second and third stages act as inverting amplifiers at higher power levels. The overall effect of the whole amplifier is that there is an output signal at the output 12 only when the input signal at the input 11 is very small. Since the first stage of the amplifier is working at a low power level, the noise level is also very low. Moreover, the point at which the first stage changes state is well defined relative to atmospheric pressure and is very close to it.

Using amplifiers of the type shown in FIG. 4, it is possible to switch reliably at very low-pressure levels. Consequently it is possible to switch at a time which may for example be ten times the time constant of the oscillator instead of at a time about equal to this time constant as has previously been the case. The advantages of this are that the capacitors have a relatively long time to charge up and can therefore be assumed to have reached a pressure very close to the asymptote and consequently to be very little affected by any externally caused change in the timing. Another advantage is that the pressure discharge sweeps through the proportional range of the amplifier in a time which is short compared with the period before which switching next takes place so that any change in the pressure at which switching occurs has only a small effect on the overall period of oscillation.

Figure 5:
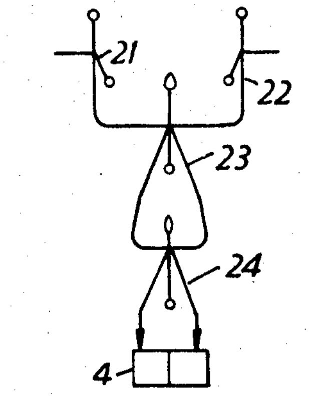
FIG. 5 is a schematic diagram of an alternative amplifying arrangement for use with the embodiment shown in FIG. 3.

FIG. 5 shows an alternative form of three stage amplifier in which the second and third stages are common to both the amplifiers 5 and 6 (Fig. 3). This is achieved by using momentum interaction amplifier stages 21 and 22, similar to the stages of the amplifier shown in FIG. 4, as the first stages of the amplifiers 5 and 6 respectively. Center dump proportional amplifiers 23 and 24 are then used as the common second and third stages, the right-hand output of the amplifier 23 and the left-hand output of the amplifier 23 and the left-hand output of the amplifier 24 performing the functions of the amplifier 5 and the left-hand output of the amplifier 23 and the right-hand output of the amplifier 24 performing the function of the amplifier 6.

Figure 6:
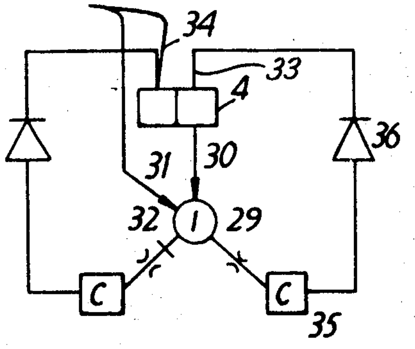
FIG. 6 is a schematic diagram of another free-running oscillator in accordance with the invention.

The oscillator shown in FIG. 3 is difficult to connect to other devices in a satisfactory manner since the resulting impedance loading alters the time constant. While it is possible to take account of this when choosing the original time constant, another way of overcoming the difficulty is to feed another digital device from the bistable device 4 and to use the outputs of the second digital device to complete the oscillator loop. The feed to the other devices can then be taken from between the two digital devices where loading has relatively little effect. Referring to FIG. 6, the second digital device can be an OR/NOR element 29. The controlling input of the element 29 is connected to output 30 of the bistable device 4 and, if another load is connected to the output 30 it has very little effect on the operation of the oscillator. A load connected to the output 31 of the bistable device 4 has even less effect.

FIG. 6 also shows means for holding or resetting the oscillator into a known state. If pressure is applied to an additional controlling input 32 of the OR/NOR device, the input 33 of the bistable device 4 becomes zero almost immediately whatever the state of the oscillator. This is because the capacitor 35 very rapidly reaches a pressure which is sufficient to cut off the output from the amplifier 36. Simultaneously with the application of pressure to the input 32 of the OR/NOR device, pressure is also applied to the input 34 of the bistable device 4 to set it so that there is no pressure at the output 30. As already mentioned, the capacitor 35 charges relatively rapidly to a pressure close to the asymptote and consequently, if the signals at the inputs 32 and 34 are removed even after quite a short time, the capacitor 35 takes almost the full time to discharge. Consequently the first half-cycle thereafter is accurate.

It has been found that, using comparable devices and the same total capacitance, circuits in accordance with the invention achieve a 5:1 lengthening of time constant compared with that which can be achieved with the circuit shown in FIG. 1. At the same time, higher accuracy, more reliable working and easier resetability is also achieved.

Figure 7:
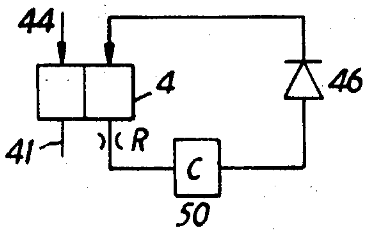
FIG. 7 is a schematic diagram of a monostable circuit in accordance with the invention.

FIG. 7 shows a monostable device in accordance with the invention. It will be seen that this arrangement is basically similar to that shown in FIG. 3 but with one feedback loop removed. The remaining loop comprising resistance R, capacitance 50 and amplifier 46 operates as already described. The device can be reset by applying a signal to the input 44. Alternatively, an OR/NOR device may be added in a similar manner to that shown in FIG. 6. The output can conveniently be taken from output 41 of the bistable devices.

I claim:

1. A pure fluid oscillator comprising a fluidic bistable device, one output of which is connected via a fluidic resistance to a fluidic capacitor and thence to the input of an analogue amplifier, the output of which is so connected to an input of the bistable device that the bistable device changes from first state to second state when the input to the amplifier reaches a predetermined pressure.

2. A pure fluid oscillator as claimed in claim 1, in which the output of the amplifier is arranged to be inverted with respect to its input and connected to the input of the bistable device corresponding to said one output thereof.

3. A pure fluid oscillator as claimed in claim 1, in which the amplifier is a multistage amplifier having an odd number of stages, each stage comprising a proportional amplifier having its output port aligned with its supply jet.

4. A pure fluid oscillator as claimed in claim 1, in which said output of the bistable device is connected to the input of an OR/NOR device, the OR output of which is connected to said resistance and the NOR output of which provides an output in phase with the other output of the bistable device.

5. A pure fluid oscillator as claimed in claim 4, in which the OR/NOR device has a second input whereby the oscillator may be set or held in a predetermined state.

6. A pure fluid oscillator as claimed in claim 1, in which the other output of the bistable device is connected via a second resistance to a second capacitor and thence to the input of a second analogue amplifier the output of which is so connected to the other input of the bistable device that the bistable device changes from its second state to its first state when the input of the second amplifier reaches said predetermined pressure.

7. A pure fluid oscillator as claimed in claim 6, in which each amplifier is a multistage amplifier having an odd number of stages, the first stage of each amplifier comprising a respective inverting proportional amplifier output port aligned with its supply jet and subsequent stages are common to both amplifiers, each stage comprising a respective center dump proportional amplifier.